(12) United States Patent
Chelstowski et al.

(10) Patent No.: US 6,389,485 B1
(45) Date of Patent: May 14, 2002

(54) GRAPHICS ADAPTER CAPABLE OF SUPPORTING LIGHTING MODELS FROM MULTIPLE APPLICATION PROGRAMMING INTERFACES WITHIN A GRAPHICS SYSTEM

(75) Inventors: Iliese Claire Chelstowski, Austin; Thomas Winters Fox, Georgetown, both of TX (US); Bimal Poddar, El Dorado Hills, CA (US); Harald Jean Smit, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/165,084

(22) Filed: Oct. 2, 1998

(51) Int. Cl.$^7$ ............................................... G06T 15/50
(52) U.S. Cl. ...................................... 709/328; 345/426
(58) Field of Search ................................ 709/321–328; 345/522, 543, 426, 664, 607

(56) References Cited

U.S. PATENT DOCUMENTS

| | | | | |
|---|---|---|---|---|
| 5,461,712 A | * | 10/1995 | Chelstowski et al. | ....... 345/543 |
| 5,673,374 A | * | 9/1997 | Sakaibara et al. | .......... 345/426 |
| 5,818,469 A | * | 10/1998 | Lawless et al. | ............. 345/522 |
| 5,914,724 A | * | 6/1999 | Deering et al. | ............. 345/607 |
| 5,936,629 A | * | 8/1999 | Brown et al. | ................ 345/426 |
| 6,016,149 A | * | 1/2000 | Morse | ......................... 345/426 |
| 6,014,144 A | * | 2/2000 | Nelson et al. | .............. 345/426 |
| 6,037,947 A | * | 3/2000 | Nelson et al. | .............. 345/426 |
| 6,044,408 A | * | 3/2000 | Engstrom et al. | ........... 709/328 |
| 6,141,013 A | * | 10/2000 | Nelson et al. | .............. 345/426 |
| 6,314,470 B1 | * | 11/2001 | Ward et al. | ................. 709/328 |

* cited by examiner

Primary Examiner—St. John Courtenay, III
(74) Attorney, Agent, or Firm—Leslie A. Van Leeuwen; Bracewell & Patterson, L.L.P.

(57) ABSTRACT

A graphics adapter capable of supporting lighting models from multiple Application Programming, Interfaces (APIs) within a graphics system is disclosed. The graphics adapter includes a dot product machine and a control means. The dot product machine can perform geometry computations regardless of the API format in which the graphics data is expressed. The control means is utilized to multiplex between a set of graphics data having a first API format and a set of graphics data having a second API format in order to determine the inputs of the dot product machine. As a result, lighting models from multiple APIs can be supported by a single graphics adapter.

15 Claims, 3 Drawing Sheets

GRAPHICS ADAPTER CAPABLE OF SUPPORTING LIGHTING MODELS FROM MULTIPLE APPLICATION PROGRAMMING INTERFACES WITHIN A GRAPHICS SYSTEM

RELATED PATENT APPLICATION

The present patent application is related to a copending application U.S. Ser. No. 09/165,085 filed on Oct. 2, 1998, entitled "A GRAPHICS ADAPTER HAVING A VERSATILE LIGHTING ENGINE", the pertinent portion of which is incorporated by reference herein.

BACKGROUND OF THE INVENTION

1. Technical Field

The present invention relates to an apparatus for graphics processing in general, and in particular to an apparatus for generating graphics images within a graphics system. Still more particularly, the present invention relates to a graphics adapter capable of supporting lighting models from Application Programming Interfaces (APIs) within a graphics system.

2. Description of the Prior Art

Within a graphics system, a software application typically generates a three-dimensional (3-D) graphics scene and provides the scene along with its lighting attributes to an Application Programming Interface (API). Each 3-D graphics scene is made up of a number of polygons that are delimited by a set of vertices. Each vertex owns attributes such as a material color, a normal, and a position. In addition, each graphics scene itself has a set of attributes such as ambient color and light sources. There is also a number of properties associated with each light source, including an ambient light intensity and the location of the light source. All these attributes are utilized to model different types of reflections coming from an object.

Today, there are two industry-standard 3-D graphics APIs that are commonly utilized for modelling light sources, namely, OpenGL and PHIGS. When the attributes of all light sources and surfaces are known, lighting from an object in a graphics scene can be evaluated utilizing a lighting equation given by one of the two above-mentioned 3-D graphics APIs. Each API defines a lighting equation as an approximation to the perceived color of an object that reflects light from defined sources. Because of cost and other related reasons, most of the prior art graphics adapters can only provide support for one of the two above-mentioned 3-D graphics APIs. It is desirable to provide a graphics adapter that is capable of supporting both 3-D graphics APIs.

SUMMARY OF THE INVENTION

In accordance with a preferred embodiment of the present invention, a dot product machine is utilized within a graphics adapter to perform geometry computations, regardless of the Application Programming Interface (API) format in which the graphics data is expressed. In addition, a control means is utilized to multiplex between a set of graphics data having a first API format and a set of graphics data having a second API format in order to determine the inputs of the dot product machine. As a result, lighting models from multiple APIs can be supported by a single graphics adapter.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
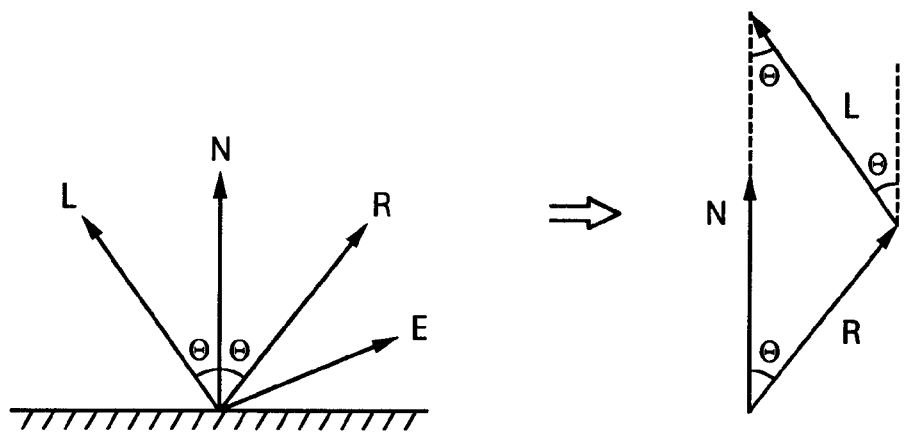
FIG. 1 is a vector diagram of several relevant light vectors on a surface of an object.

Both OpenGL and PHIGS define an approximation to a perceived color of the object that reflects light from various sources in the form of a lighting equation. The OpenGL lighting equation in its general form is as follows:

$$Color = Matl_{emis} + Matl_{amb} \times Model_{amb} + \quad (1)$$

$$\sum_{i=0}^{7} (att_i)(spot_i)[Matl_{amb} \times L_{amb}(i) +$$

$$(N \cdot L(i))Matl_{diff} \times L_{diff}(i) +$$

$$(f_i)(N \cdot H(i))^{se} Matl_{spec} \times L_{spec}(i)]$$

where

| | |
|---|---|
| + | component-wise addition of red, green, and blue channels; |
| × | component-wise multiplication of red, green, and blue channels; |
| · | dot product operation clamped at zero; |
| $Matl_{emis}$ | emissive color of material; |
| $Matl_{amb}$ | ambient color of material; |
| $Matl_{diff}$ | diffuse color of material; |
| $Matl_{spec}$ | specular color of material; |
| $Model_{amb}$ | ambient model color or ambient color of scene; |
| $L_{amb}$ (i) | ambient intensity of light source number i; |
| $L_{diff}$ (i) | diffuse intensity of light source number i; |
| $L_{spec}$ (i) | specular intensity of light source number i; |
| N | surface normal vector at vertex (normalized); |
| L (i) | vector pointing from vertex to light source i (normalized); |
| H (i) | half vector corresponding to light source i (normalized) where the non-normalized H (i) = L (i) + (0, 0, 1) for a viewer at (0, 0, ∞); |
| se | specular exponent; |
| $att_i$ | attenuation factor; |
| $spot_i$ | spotlight effect; |
| $f_i$ | equals 1.0 when N · L > 0 and equals 0.0 otherwise. |

On the other hand, the general form of PHIGS lighting equation is as follows:

$$Color = \sum_{i=0}^{7} (att_i)(spot_i)[a_c \times D_s \times L_{amb}(i) + \quad (2)$$

$$(N \cdot L(i))d_c \times D_s \times L_{diff}(i) +$$

-continued $$(f_i)(E \cdot R(i))^{se} S_c \times S_s \times L_{spec}(i)]$$

where

| | |
|---|---|
| + | component-wise addition of red, green, and blue channels; |
| × | component-wise multiplication of red, green, and blue channels; |
| · | dot product operation clamped at zero; |
| $a_c$ | ambient reflection coefficient of the surface; |
| $d_c$ | diffuse reflection coefficient of the surface; |
| $s_c$ | specular reflection coefficient of the surface; |
| $D_s$ | diffuse color component of the surface; |
| $S_s$ | specular color component of the surface; |
| $L_{amb}$ (i) | ambient intensity of light source number i; |
| $L_{diff}$ (i) | diffuse intensity of light source number i; |
| $L_{spec}$ (i) | specular intensity of light source number i; |
| N | surface normal vector at vertex (normalized); |
| L (i) | vector pointing from vertex to light source i (normalized); |
| E | vector pointing from vertex to viewer (normalized); |
| R (i) | reflection vector corresponding to light source i (normalized) where the angle of reflection between N and R = the angle of incidence between L and N; |
| se | specular exponent; |
| $att_i$ | attenuation factor; |
| $spot_i$ | spotlight effect; |
| $f_i$ | equals 1.0 when N · L > 0 and equals 0.0 otherwise. |

For an infinite viewpoint and directional light sources, OpenGL lighting equation (1) becomes:

$$Color = Matl_{emis} + Matl_{amb} \times Model_{amb} + \quad (3)$$

$$\sum_{i=0}^{7} [Matl_{amb} \times L_{amb}(i) + (N \cdot L(i)) Matl_{diff} \times L_{diff}(i) +$$

$$(f_i)(N \cdot H(i))^{se} Matl_{spec} \times L_{spec}(i)]$$

and PHIGS lighting equation (2) becomes:

$$Color = \sum_{i=0}^{7} [a_c \times D_s \times L_{amb}(i) + (N \cdot L(i)) d_c \times D_s \times L_{diff}(i) + \quad (4)$$

$$(f_i)(E \cdot R(i))^{se} S_c \times S_s \times L_{spec}(i)]$$

Despite the apparent differences between OpenGL lighting equation (3) and PHIGS lighting equation (4), these two lighting equations can be made to look comparable to each other such that a single hardware structure, such as a dot product machine, can be utilized within a graphics adapter for color computations, regardless of which Application Programming Interface (API) is being utilized. This is accomplished by first having PHIGS host software send values of zero for parameters $Matl_{emis}$ and $Model_{amb}$. Also, the ($a_c \times D_s$), ($d_c \times D_s$), and ($S_c \times S_s$) products in PHIGS lighting equation (4) can be pre-computed by the PHIGS host software and the results sent to the graphics adapter as $Matl_{amb}$, $Matl_{diff}$ and $Matl_{spec}$, respectively. Accordingly, PHIGS equation (4) becomes:

$$Color = \sum_{i=0}^{7} [Matl_{amb} \times L_{amb}(i) + (N \cdot L(i)) Matl_{diff} \times L_{diff}(i) + \quad (5)$$

$$(f_i)(E \cdot R(i))^{se} Matl_{spec} \times L_{spec}(i)]$$

At this point, PHIGS lighting equation (5) has an almost identical structure as OpenGL lighting equation (3). One difference is that PHIGS lighting equation (5) requires an evaluation of a dot product E·R while OpenGL lighting equation (3) requires an evaluation of a dot product N·H.

Referring now to the drawings and specifically to FIG. 1, there is illustrated a vector diagram of several relevant light vectors on a surface of an object. The reflection vector, R, is not readily available because it is not provided by the graphics software application. Thus, a dot product E·R can be manipulated as follows.

From vector addition, $$R+L=[|R|Cos \theta+|L|COS \theta]N$$

Because both vectors R and L are normalized (i.e., |R|=|L|=1), thus $$R+L=[Cos \theta+Cos \theta]N$$

$$R=2 Cos \theta N-L$$

Because $N \cdot L=|N||L| Cos \theta$, and $|N|=|L|=1$, thus $$Cos \theta=N \cdot L$$

$$R=2(N \cdot L)N-L$$

and
Hence, $$E \cdot R=E \cdot [2(N \cdot L)N-L]$$

$$E \cdot R=2(N \cdot L)(N \cdot E)-(E \cdot L) \quad (6)$$

Now the calculation of dot product E·R is only dependent upon vectors N, L, and E, which are readily available. Accordingly, equation (6) can be rewritten as:

$$E \cdot R=(N \cdot L)(N \cdot E)+(N \cdot L)(N \cdot E)+(-E \cdot L) \quad (7)$$

For an infinite viewpoint, vector E is a constant across all vertices, and for infinite light sources, vector L is a constant across all vertices. Therefore dot product E·L is a constant for each light source, and dot product E·L can be pre-computed by the host graphics software and sent to the graphics adapter as a constant K=−(E·L). Accordingly, equation (7) becomes:

$$E \cdot R=(N \cdot L)(N \cdot E)+(N \cdot L)(N \cdot E)+K \quad (8)$$

Finally, equation (8) can be rewritten in the form of:

$$E \cdot R=(N \cdot L)(N \cdot E)+(N \cdot L)(N \cdot E)+K(1.0) \quad (9)$$

The dot products in OpenGL lighting equation (3) may be computed in two cycles, having N·L computed in the first cycle, N·H computed in the second cycle. With equation (9), the dot products in PHIGS lighting equation (5) may be computed in three cycles, having N·L computed in the first cycle, N·E computed in the second cycle, and equation (9) computed in the third cycle. In the third cycle, quantities (N·L), (N·E), K, and 1.0 are sent to respective inputs of a dot product machine within a single graphics adapter, as will be illustrated infra.

Figure 2:
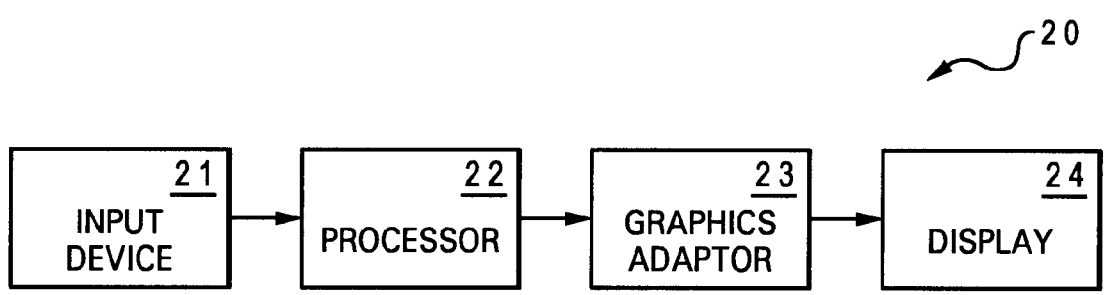
FIG. 2 is a block diagram of a graphics system in which a preferred embodiment of the present invention may be incorporated.

With reference now to FIG. 2, there is illustrated a block diagram of a graphics system in which a preferred embodiment of the present invention may be incorporated. As shown, a 3-D graphics system 20 includes an input device 21, a processor 22, a graphics adapter 23, and a display 24. Input device 21 may be a keyboard, a memory, a peripheral storage device, or a communications port. Input device 21 communicates data with processor 22. Processor 22 may be implemented with a graphics processor or a math co-processor as is well known in the art. Coupled to processor 22, graphics adapter 23 provides the display of 3-D graphics scenes via display 24.

Figure 3:
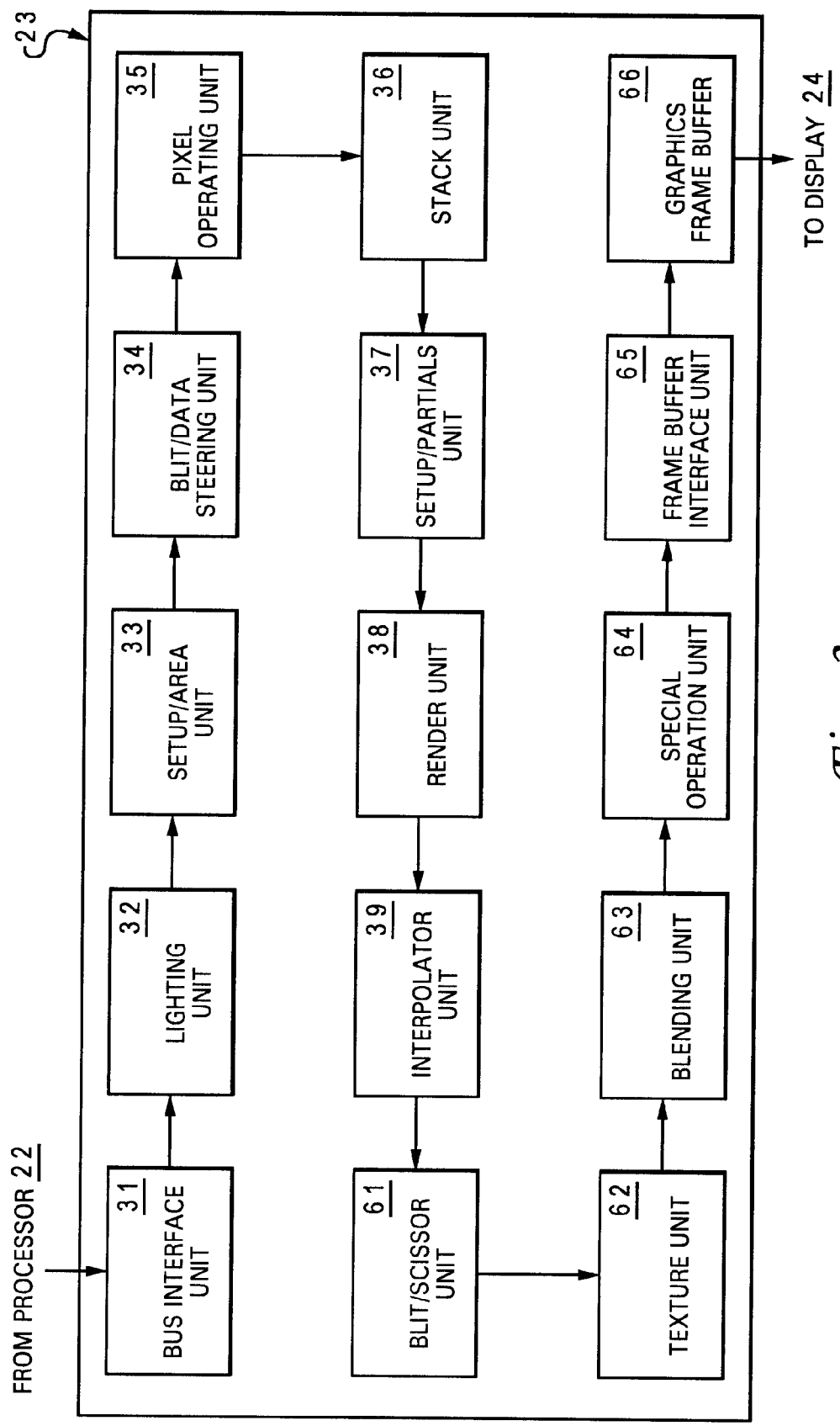
FIG. 3 is a functional block diagram of the graphics adapter from FIG. 2, in accordance with a preferred embodiment of the present invention.

Referring now to FIG. 3, there is illustrated a functional block diagram of graphics adapter 23, in accordance with a preferred embodiment of the present invention. Graphics adapter 23 may include a Bus Interface unit 31, a Lighting unit 32, a Setup/area unit 33, a Blit/Data steering unit 34, a Pixel operations unit 35, a Stack unit 36, a Setup/Partials unit 37, a Render unit 38, an Interpolator unit 39, a Blit/Scissor unit 61, a Texture unit 62, a Blending unit 63, a Special Operations unit 64, a Frame Buffer Interface unit 65, and a Graphics frame buffer 66, that sequentially receive and process graphics data. Except for Lighting unit 32, each of the above-mentioned functional units possesses a structure and performs a function that is known to those skilled in the relevant art.

Figure 4:
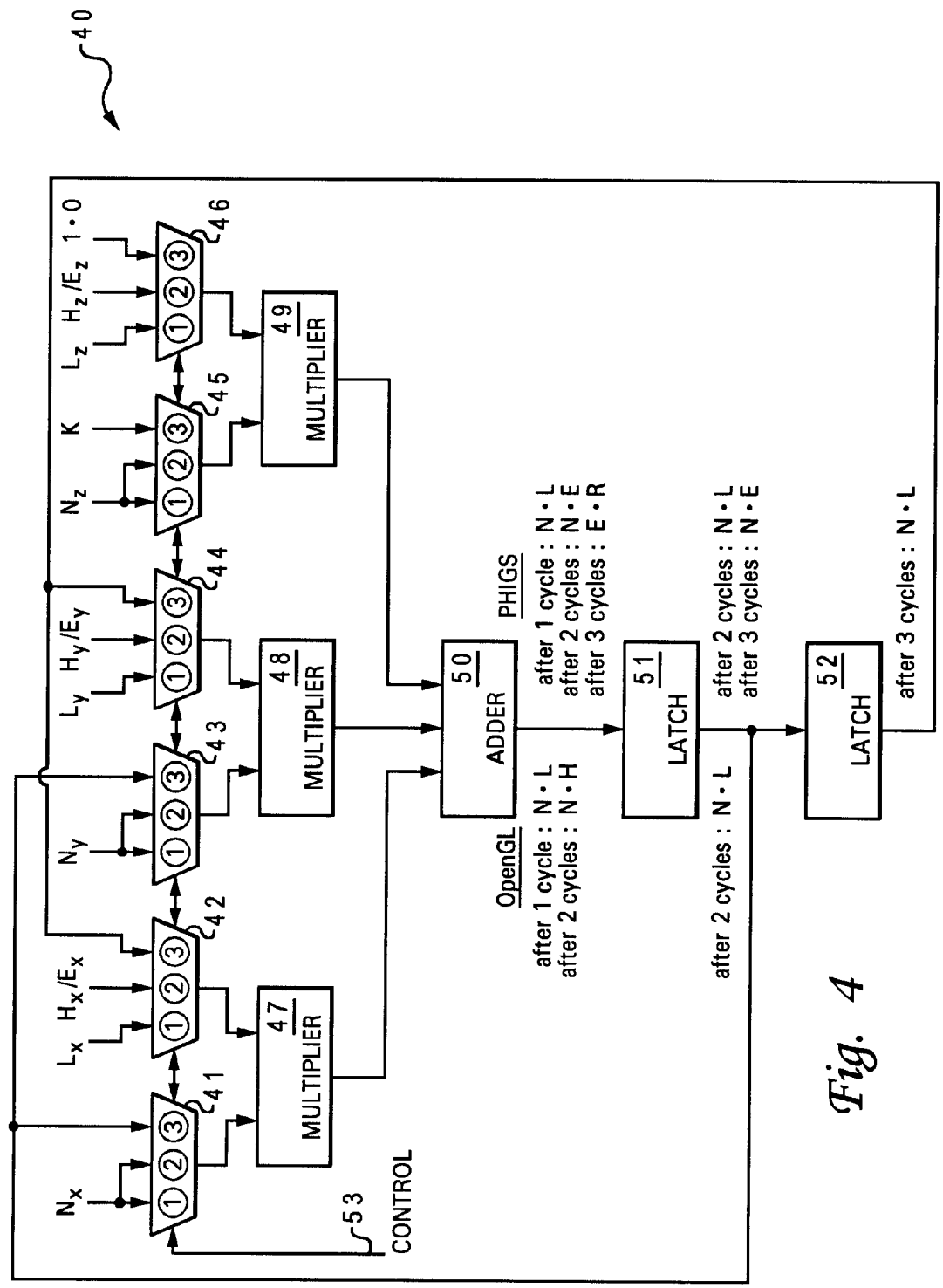
FIG. 4 is a block diagram of a dot product machine within the lighting unit of the graphics adapter from FIG. 2, which supports lighting models from multiple Application Programming Interfaces, in accordance with a preferred embodiment of the present invention.

With reference now to FIG. 4, there is illustrated a block diagram of a dot product machine within lighting unit 32 for supporting lighting models from multiple APIs, in accordance with a preferred embodiment of the present invention. As shown, dot product machine 40 includes multiplexors 41–46, multipliers 47–49, an adder 50, and latches 51, 52. Each of multiplexors 41–46 has three inputs. In FIG. 4, each circled input number shown on each of multiplexors 41–46 denotes a respective cycle input. For example, circled input number 1 on multiplexors 41, 43, and 45 represents the fact that vector N will be latched in at multiplexors 41, 43, and 45 in cycle 1. The format of a set of incoming graphics data (i.e. OpenGL format or PHIGS format) can be provided to dot product machine 40 via control 53. For example, a logical "1" in control 53 signifies the set of incoming graphics data is in the OpenGL format while a logical "0" in control 53 signifies the set of incoming graphics data is in the PHIGS format.

As mentioned previously, dot products N·L and N·H within OpenGL lighting equation (3) may be computed in two cycles. Vectors N and L are initially sent to the cycle 1 inputs of multiplexors 41, 43, 45 and multiplexors 42, 44, 46, respectively. In the first cycle, dot product N·L is computed by multiplying vectors N and L within multipliers 47–49 and adding the products from multipliers 47–49 within adder 50. In the meantime, vectors N and H are sent to the cycle 2 inputs of multiplexors 41, 43, 45 and multiplexors 42, 44, 46, respectively. Thus, in the second cycle, dot product N·H can be computed by multiplying vectors N and H within multipliers 47–49 and adding the products from multipliers 47–49 within adder 50. The results of dot products N·L and N·H can be obtained from adder 50 after cycle 1 and cycle 2, respectively. Notice that the cycle 3 inputs of multiplexors 42, 44, and 46 are not utilized for calculating OpenGL lighting equation (3).

With dot product machine 40, dot product E·R within PHIGS lighting equation (5) may be computed in three cycles. This is accomplished by computing dot product N·L in the first cycle, computing dot product N·E in the second cycle, and computing dot product E·R (as outlined in equation (9)) in the third cycle. Vectors N and L are initially sent to the cycle 1 inputs of multiplexors 41, 43, 45 and multiplexors 42, 44, 46, respectively. In the first cycle, dot product N·L is computed by multiplying vectors N and L within multipliers 47–49 and adding the products from multipliers 47–49 within adder 50. In the meantime, vectors N and E are sent to the cycle 2 inputs of multiplexors 41, 43, 45 and multiplexors 42, 44, 46, respectively. Thus, in the second cycle, dot product N·E can be computed by multiplying vectors N and E within multipliers 47–49 and adding the products from multipliers 47–49 within adder 50. In the meantime, results of dot product N·E from cycle 2 are sent to the inputs of multiplexors 41 and 43 and constant K is sent to the input of multiplexor 45, while results of dot product N·L from cycle 1 are sent to the inputs of multiplexors 42 and 44 and constant 1.0 is sent to the input of multiplexor 46. The result of dot product N·L is available at this point from latch 52 while the result of dot product N·E is available at this point from latch 51. Thus, in the third cycle, dot product E·R is computed by multiplying the dot product results according to equation (9) within multipliers 47–49 and adding the products from multipliers 47–49 within adder 50. The results of dot product E·R can be obtained from adder 50 after cycle 3. Hence, a single dot product machine 40 can be utilized to perform color computations, regardless of the API format in which the graphics data is being utilized.

As has been described, the present invention provides a graphics adapter for supporting lighting models from multiple APIs within a graphics system. With the present invention, the computation of the OpenGL and PHIGS lighting equations can be integrated into a single graphics adapter. The ability to compute lighting for graphics data having two API formats within a single dot product machine reduces the hardware resources normally required. Although OpenGL and PHIGS lighting equations are utilized to illustrate a preferred embodiment of the present invention, it is understood by those skilled in the art that the principle as disclosed may also to applicable to other APIs.

While the invention has been particularly shown and described with reference to a preferred embodiment, it will be understood by those skilled in the art that various changes in form and detail may be made therein without departing from the spirit and scope of the invention.

What is claimed is:

1. A graphics adapter capable of supporting lighting models from multiple Application Programming Interfaces (APIs) within a graphics system, comprising:

a dot product machine; and a control means for multiplexing between a set of graphics data having a first API format and a set of graphics data having a second API format to select inputs of said dot product machine, such that lighting models from multiple APIs can be supported by said graphics adapter.

2. The graphics adapter according to claim 1, wherein said first API format is OpenGL.

3. The graphics adapter according to claim 1, wherein said second API format is PHIGS.

4. The graphics adapter according to claim 1, wherein said dot product machine includes a plurality of multiplexors and multipliers.

5. The graphics adapter according to claim 1, wherein said control means includes a single bit control.

6. A graphics system capable of supporting lighting models from multiple Application Programming Interfaces (APIs), comprising:

a processor;

an input device, coupled to said processor, for communicating with said processor;

a graphics adapter coupled to said processor, wherein said graphics adapter further includes a dot product machine; and a control means for multiplexing between a set of graphics data having a first API format and a set of graphics data having a second API format to select inputs of said dot product machine, such that lighting models from multiple APIs can be supported by said graphics adapter;

a display, coupled to said graphics adapter, for displaying graphics data received from said graphics adapter.

7. The graphics system according to claim 6, wherein said first API format is OpenGL.

8. The graphics system according to claim 6, wherein said second API format is PHIGS.

9. The graphics system according to claim 6, wherein said dot product machine includes a plurality of multiplexors and multipliers.

10. The graphics system according to claim 6, wherein said control means includes a single bit control.

11. A method for supporting lighting models from multiple Application Programming Interfaces (APIs) within a graphics system, said method comprising the steps of:

providing a dot product machine; and multiplexing between a set of graphics data having a first API format and a set of graphics data having a second API format to select inputs of said dot product machine, such that lighting models from multiple APIs can be supported by said graphics adapter.

12. The method according to claim 11, wherein said first API format is OpenGL.

13. The method according to claim 11, wherein said second API format is PHIGS.

14. The method according to claim 11, wherein said dot product machine includes a plurality of multiplexors and multipliers.

15. The method according to claim 11, wherein said multiplexing step is performed by utilizing a single bit control.

* * * * *